United States Patent
Taki

(10) Patent No.: US 12,405,454 B2
(45) Date of Patent: Sep. 2, 2025

(54) ZOOM LENS AND IMAGE PICKUP APPARATUS HAVING THE SAME

(71) Applicant: CANON KABUSHIKI KAISHA, Tokyo (JP)

(72) Inventor: Yoshiyuki Taki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/619,272

(22) Filed: Mar. 28, 2024

(65) Prior Publication Data

US 2024/0337820 A1    Oct. 10, 2024

(30) Foreign Application Priority Data

Apr. 7, 2023  (JP) .................. 2023-063092

(51) Int. Cl.
*G02B 13/06* (2006.01)
*G02B 9/34* (2006.01)
*G02B 13/00* (2006.01)
*G02B 13/02* (2006.01)

(52) U.S. Cl.
CPC ............... *G02B 13/06* (2013.01); *G02B 9/34* (2013.01); *G02B 13/009* (2013.01); *G02B 13/02* (2013.01)

(58) Field of Classification Search
USPC ........................................... 348/36
See application file for complete search history.

(56) References Cited

U.S. PATENT DOCUMENTS

| | | | |
|---|---|---|---|
| 2017/0068076 A1* | 3/2017 | Ito | G02B 27/0025 |
| 2017/0075095 A1* | 3/2017 | Kimura | G02B 15/144511 |
| 2017/0090167 A1* | 3/2017 | Abe | G02B 15/173 |

FOREIGN PATENT DOCUMENTS

| | | |
|---|---|---|
| JP | 2004-240023 A | 8/2004 |
| JP | 2013-015621 A | 1/2013 |
| JP | 2017-068115 A | 4/2017 |
| JP | 2018-189767 A | 11/2018 |
| JP | 2019-101362 A | 6/2019 |

* cited by examiner

*Primary Examiner* — Nigar Chowdhury

(74) *Attorney, Agent, or Firm* — Carter, DeLuca & Farrell LLP

(57) ABSTRACT

A zoom lens includes, in order from an object side to an image side, a first lens unit having negative refractive power, and a plurality of subsequent lens units. The zoom lens further includes an aperture stop. For zooming, the first lens unit is fixed, and the plurality of subsequent lens units move to change a distance between adjacent lens units. Predetermined inequalities are satisfied.

13 Claims, 9 Drawing Sheets

ZOOM LENS AND IMAGE PICKUP APPARATUS HAVING THE SAME

BACKGROUND

Technical Field

One of the aspects of the embodiments relates to a zoom lens that is used for imaging and the like.

Description of Related Art

As a super-wide-angle zoom lens such as a fisheye lens, Japanese Patent Laid-Open No. 2017-068115 discloses a fisheye zoom lens in which various aberrations are corrected. Japanese Patent Laid-Open No. 2004-240023 discloses a fisheye lens configured to switch between two focal points. Japanese Patent Laid-Open No. 2013-015621 discloses a wide-angle zoom lens in which various aberrations are corrected.

In order to acquire an entire circumference fisheye image during moving image capturing using a super-wide-angle lens, the focal length is to be set short. Then, the refractive power arrangement becomes a retrofocus type in which extreme negative refractive power is located on the front side, and various aberrations associated with magnification variation (zooming) significantly fluctuate. In order to electrically drive the movable lens unit, the weight of the movable lens unit may be reduced.

However, it is difficult for the lenses disclosed in Japanese Patent Laid-Open Nos. 2017-068115, 2004-240023, and 2013-015621 to sufficiently suppress aberrational fluctuations associated with zooming and to reduce the weight of the movable lens unit.

SUMMARY

A zoom lens according to one aspect of the disclosure includes, in order from an object side to an image side, a first lens unit having negative refractive power; and a plurality of subsequent lens units. The zoom lens further comprises an aperture stop. For zooming, the first lens unit is fixed, and the plurality of subsequent lens units move to change a distance between adjacent lens units. The following inequalities are satisfied:

$$5.5 \leq Tsw/fw \leq 9.5$$

$$2.5 \leq Skw/fw \leq 7.0$$

where Tsw is a distance on an optical axis from a lens surface closest to an object of the zoom lens to the aperture stop at a wide-angle end, fw is a focal length of the zoom lens at the wide-angle end, and Skw is a back focus of the zoom lens at the wide-angle end. An image pickup apparatus having the above zoom lens also constitutes another aspect of the disclosure.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure. Prior to a detailed description according to Examples 1 to 3, matters common to each example will be described.

The extreme retrofocus type refractive power arrangement in which negative refractive power is disposed on the front side in order to provide a zoom lens with a super-wide-angle, optical performance is affected over the entire zoom range. As the angle becomes super-wide, the diameter and weight of the lens unit on the object side of the aperture stop are more likely to increase. In a case where a super-wide-angle zoom lens adopts a so-called short zoom arrangement in which the negative lens unit on the object side moves during zooming, it is difficult to electrically drive the large and heavy lens unit.

Thus, each example acquires excellent optical performance over the entire zoom range and reduces the weight of the movable lens unit by correcting in a well-balanced manner aberrational fluctuations associated with zooming caused by super-wide-angle zooming.

Figure 1A:
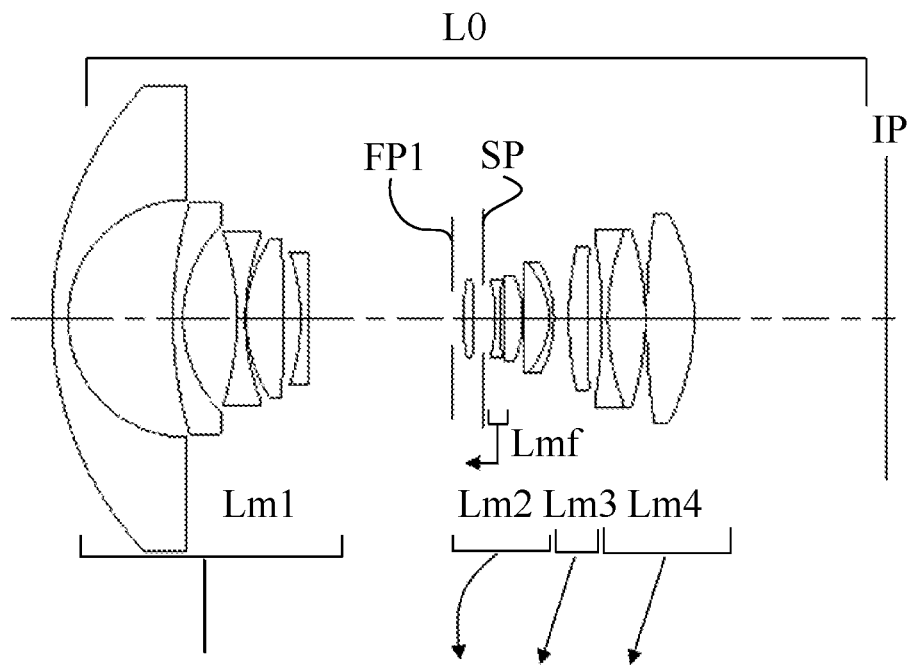
FIGS. 1A, 1B, and 1C are sectional views illustrating the configuration of a zoom lens according to Example 1 at a wide-angle end, an intermediate zoom position, and a telephoto end, respectively.
Figure 1B:
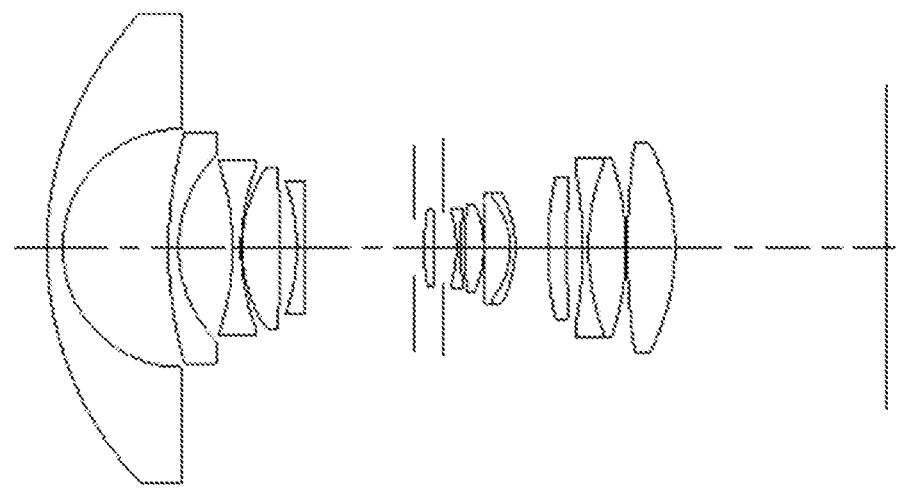
Figure 1C:
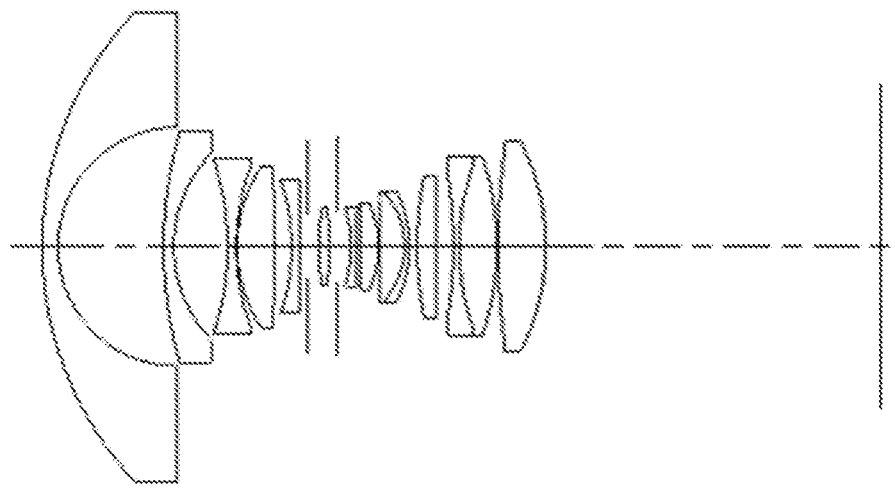
Figure 3A:
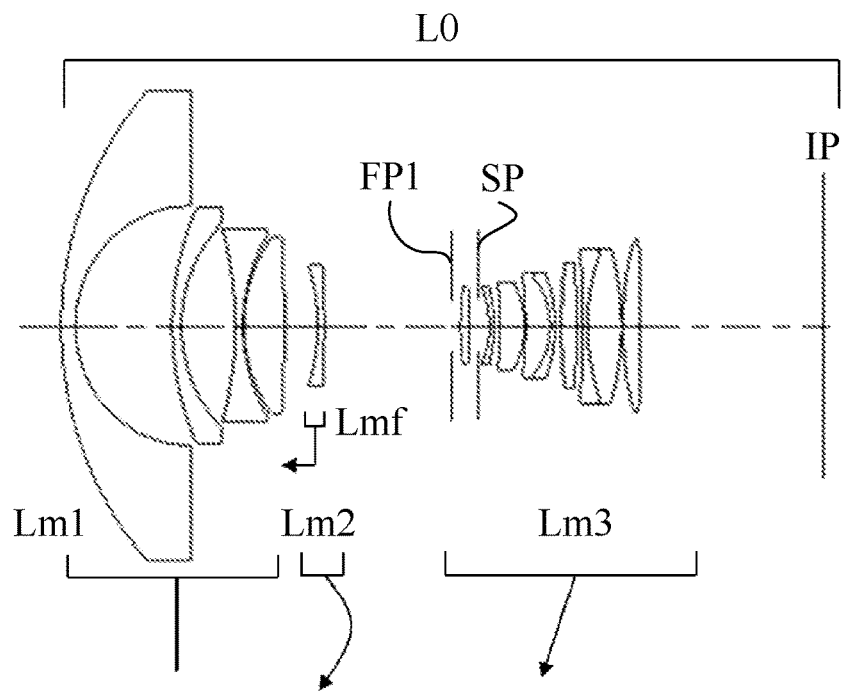
FIGS. 3A, 3B, and 3C are sectional views illustrating the configuration of a zoom lens according to Example 2 at a wide-angle end, an intermediate zoom position, and a telephoto end, respectively.
Figure 3B:
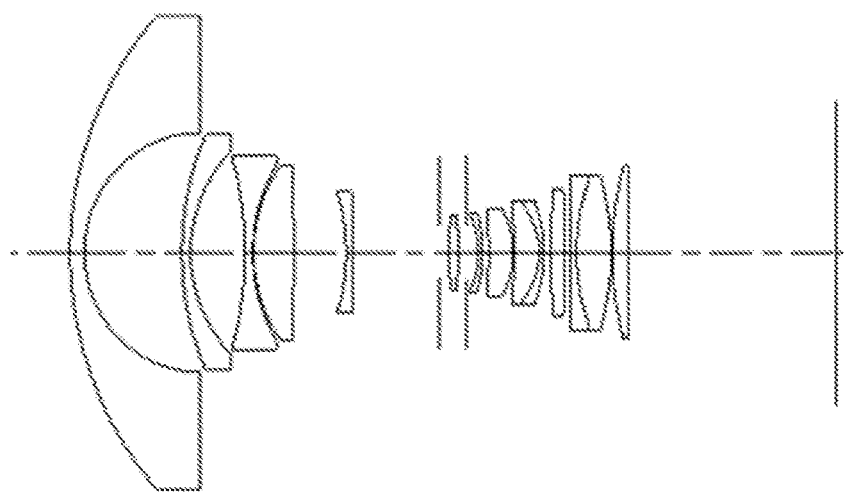
Figure 3C:
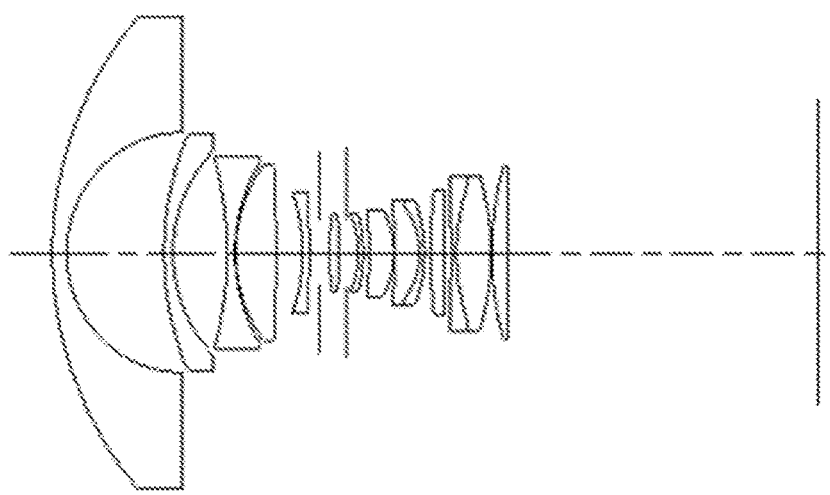
Figure 5A:
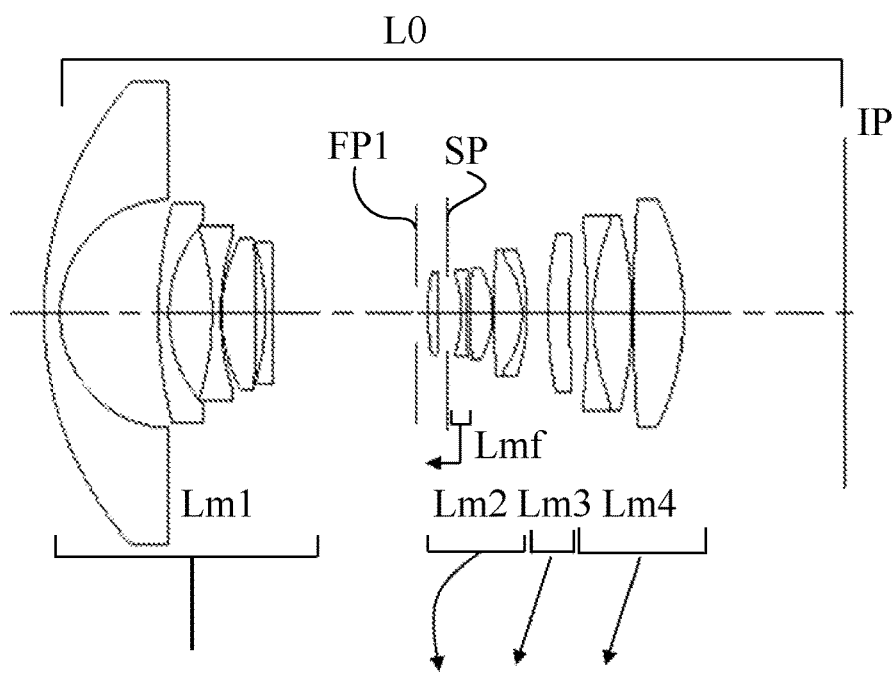
FIGS. 5A, 5B, and 5C are sectional views illustrating the configuration of a zoom lens according to Example 3 at the wide-angle end, the intermediate zoom position, and the telephoto end, respectively.
Figure 5B:
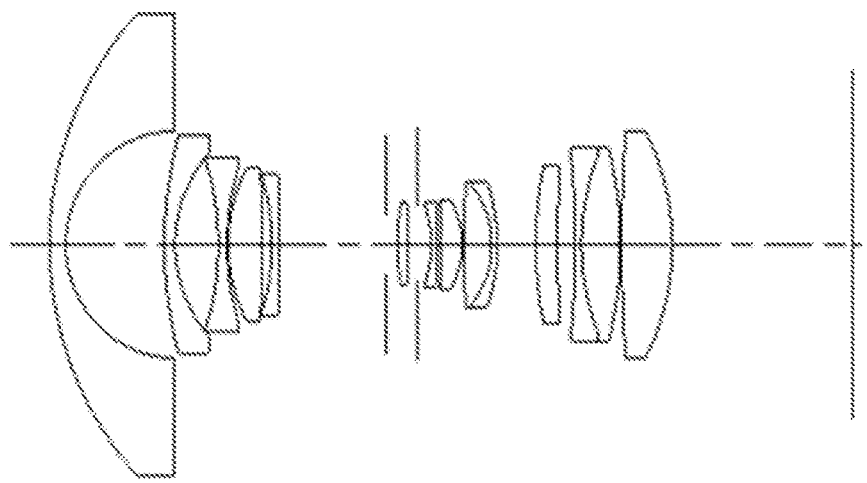
Figure 5C:
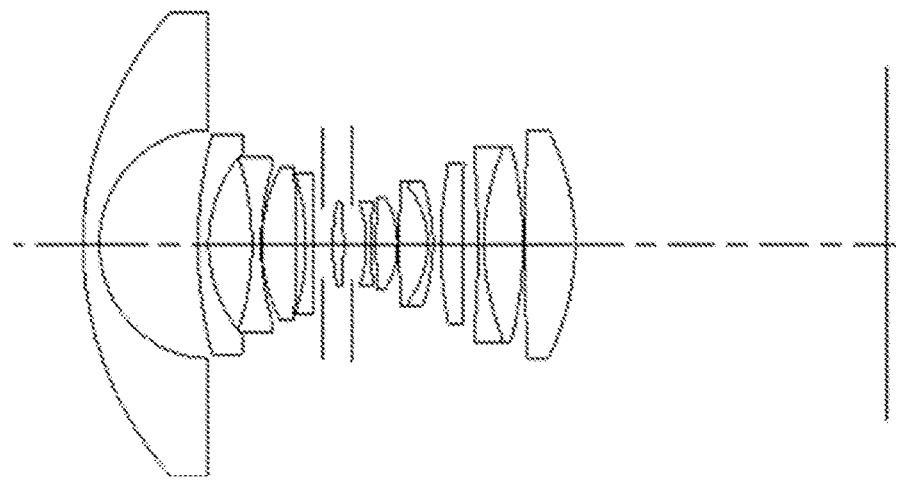

FIGS. 1A, 3A, and 5A illustrate the configurations of the zoom lenses L0 according to Examples 1, 2, and 3, respectively, at a wide-angle end in an in-focus state (on an object) at infinity. FIGS. 1B, 3B, and 5B illustrate the configurations of the zoom lenses L0 according to Examples 1, 2, and 3, respectively, at an intermediate zoom position in the in-focus state at infinity. FIGS. 1C, 3C, and 5C illustrate the configurations of the zoom lenses L0 according to Examples 1, 2, and 3, respectively, at a telephoto end in the in-focus state at infinity. The zoom lens L0 according to each example is used as an imaging optical system for various image pickup apparatuses such as a digital video camera, a digital still camera, a broadcasting camera, a film-based camera, and a surveillance camera.

In each figure, a left side is an object side, and a right side is an image side. The zoom lens L0 according to each example includes a plurality of lens units. A lens unit is a group of one or more lenses that move or stand still during zooming or focusing. That is, a distance between adjacent lens units changes during zooming or focusing. The lens unit may include an aperture stop.

The wide-angle end and the telephoto end refer to zoom positions at a maximum angle of view (shortest focal length) and a minimum angle of view (longest focal length) in a case where the lens unit that moves during zooming is controllably or mechanically located at both ends of a movable range on the optical axis.

In each figure, Lmi represents an i-th lens unit (where i is a natural number) counted from the object side among the plurality of lens units. The zoom lens L0 according to each example includes, in order from the object side to the image side, a first lens unit Lm1 having negative refractive power and a plurality of subsequent lens units. For magnification variation (zooming), the first lens unit Lm1 is fixed (does not move). For focusing, a lens unit including at least one lens (or a lens subunit that is part of a single lens unit) is moved. In the following description, the lens unit that moves during focusing will be referred to as a focus lens unit Lmf. In each figure, the arrows illustrated below the lens units (Lm2 to Lm4) that move during zooming indicate their moving loci during zooming from the wide-angle end to the telephoto end. During focusing from an object at infinity to a close distance, the focus lens unit Lmf moves toward the object side as illustrated by the arrow below the focus lens unit Lmf in each figure.

The plurality of subsequent lens units move so as to draw mutually different moving loci for zooming. In each figure, SP represents an aperture stop (diaphragm). The aperture stop SP is provided in one of the plurality of subsequent lens units so as to move together with that lens unit. FP1 represents an auxiliary diaphragm for cutting unnecessary light that does not contribute to imaging.

IP represents an image plane. An imaging surface of a solid-state image pickup apparatus (photoelectric conversion device) such as a CCD sensor or a CMOS sensor or a film surface (photosensitive surface) of a film-based camera is placed on the image plane IP.

The zoom lens L0 according to each example satisfies the following inequality (1):

$$5.5 \leq Tsw/fw \leq 9.5 \quad (1)$$

where Tsw is a distance on the optical axis from the frontmost surface as a lens surface closest to the object of the zoom lens L0 to the aperture stop SP at the wide-angle end, and fw is a focal length of the zoom lens L0 at the wide-angle end.

Inequality (1) defines a proper relationship between the distance from the frontmost surface of the zoom lens L0 to the aperture stop SP at the wide-angle end and the focal length of the entire zoom lens L0 at the wide-angle end in order to widen the angle of the zoom lens L0. In a case where Tsw/fw becomes higher than the upper limit of inequality (1), the aperture stop SP becomes too far from the forefront surface, and it becomes difficult to secure the necessary angle of view of the zoom lens L0. In a case where Tsw/fw becomes lower than the lower limit of inequality (1), the aperture stop SP becomes too close to the frontmost surface, and the refractive power of the lens unit on the object side of the aperture stop SP becomes too strong and it becomes difficult to maintain the excellent optical performance of the zoom lens L0.

Inequality (1) may be replaced with inequality (1a) below:

$$7.0 \leq Tsw/fw \leq 9.0 \quad (1a)$$

Inequality (1) may be replaced with inequality (1b) below:

$$7.60 \leq Tsw/fw \leq 8.85 \quad (1b)$$

Satisfying inequality (1) ((1a) or (1b)) can realize a wide-angle zoom lens that has a lightweight movable lens unit and excellent optical performance over the entire zoom range.

The zoom lens L0 according to each example may satisfy at least one of the following inequalities (2) to (5):

Inequality (2) may be satisfied:

$$2.5 \leq Skw/fw \leq 7.0 \quad (2)$$

where Skw is a back focus of the zoom lens L0 at the wide-angle end.

Inequality (2) defines a proper refractive power arrangement of the zoom lens L0. In a case where Skw/f becomes higher than the upper limit of inequality (2), the asymmetry of the refractive power arrangement increases and it becomes difficult to ensure excellent optical performance over the entire zoom range. In a case where Skw/fw becomes lower than the lower limit of inequality (2), it becomes difficult to secure the necessary angle of view at the wide-angle end.

Inequality (3) may be satisfied:

$$0.60 \leq T1w/Skw \leq 1.00 \quad (3)$$

where T1w is an entrance pupil position of the zoom lens L0 at the wide-angle end.

Inequality (3) defines a proper entrance pupil position of the zoom lens L0. In a case where the entrance pupil position moves away from the frontmost surface so that T1w/Skw becomes higher than the upper limit of inequality (3), the zoom lens L0 becomes large. In a case where the entrance pupil position approaches the frontmost surface so that T1w/Skw becomes lower than the lower limit of inequality (3), the refractive power of each lens unit becomes too strong, and it becomes difficult to secure excellent optical performance over the entire zoom range.

Inequality (4) may be satisfied:

$$-2.5 \leq (R2 + R1)/(R2 - R1) \leq -1.8 \quad (4)$$

where R1 is a radius of curvature of the lens surface (frontmost surface) on the object side of the foremost lens as the lens closest to the object in the zoom lens L0, and R2 is a radius of curvature of the lens surface on the image side of the foremost lens as the lens closest to the object in the zoom lens L0.

Inequality (4) defines a proper shape (shape factor) of the foremost lens. In a case where R1 and R2 are close to each other so that the shape factor becomes higher than the upper limit of inequality (4), it leads to an increase in the size of the entire system. In a case where there is a difference between R1 and R2 such that the shape factor becomes lower than the lower limit of inequality (4), it becomes difficult to correct various aberrations over the entire zoom range.

Inequality (5) may be satisfied:

$$170° \le 2\omega \le 190° \quad (5)$$

where ω(°) is a half angle of view at the wide-angle end of the zoom lens L0.

Inequality (5) relates to a proper angle of view of the zoom lens L0. In a case where 2ω becomes lower than the lower limit of inequality (5), the necessary angle of view cannot be secured. In a case where 2ω becomes higher than the upper limit of inequality (5), it does not currently exist in an independent optical system.

Inequalities (2) to (5) may be replaced with inequalities (2a) to (5a) as follows:

$$2.7 \le Skw/fw \le 5.0 \quad (2a)$$
$$0.64 \le T1w/Skw \le 0.90 \quad (3a)$$
$$-2.3 \le (R2 + R1)/(R2 - R1) \le -1.9 \quad (4a)$$
$$175° \le 2\omega \le 190° \quad (5a)$$

Inequalities (2) to (5) may be replaced with inequalities (2b) to (5b) as follows:

$$3.0 \le Skw/fw \le 4.0 \quad (2b)$$
$$0.68 \le T1w/Skw \le 0.80 \quad (3b)$$
$$-2.2 \le (R2 + R1)/(R2 - R1) \le -2.0 \quad (4b)$$
$$178° \le 2\omega \le 188° \quad (5b)$$

A specific description will now be given of Examples 1 to 3. After Example 3, numerical examples 1 to 3 corresponding to Examples 1 to 3 will be illustrated.

In Examples 1 and 3, Lm1 represents a first lens unit having negative refractive power, Lm2 represents a second lens unit having positive refractive power, Lm3 represents a third lens unit having positive refractive power, and Lm4 represents a fourth lens unit having positive refractive power.

The first lens unit Lm1 is fixed for zooming and focusing. For focusing from an object at infinity to a close object, the focus lens unit Lmf as a lens subunit within the second lens unit Lm2 moves toward the object side as illustrated by the arrow.

For zooming from the wide-angle end to the telephoto end, the second lens unit Lm2, third lens unit Lm3, and fourth lens unit Lm4 move so as to draw mutually different loci. More specifically, the second lens unit Lm2 moves so as to draw a convex locus toward the object side, and the third lens unit Lm3 and the fourth lens unit Lm4 move monotonically toward the object side.

The aperture stop SP is disposed within the second lens unit Lm2, and the auxiliary diaphragm FP1 is provided closest to the object in the second lens unit Lm2.

In Example 2, Lm1 represents a first lens unit having negative refractive power, Lm2 represents a second lens unit having negative refractive power, and Lm3 represents a third lens unit having positive refractive power.

The first lens unit Lm1 is fixed for zooming and focusing. For focusing from an object at infinity to a close object, the second lens unit Lm2 as a focus lens unit Lmf moves toward the object side.

For zooming from the wide-angle end to the telephoto end, the second lens unit Lm2 and the third lens unit Lm3 move so as to draw mutually different loci. More specifically, the second lens unit Lm2 moves so as to draw a convex locus toward the image side, and the third lens unit Lm3 moves monotonically toward the object side.

The aperture stop SP is disposed within the third lens unit Lm3, and the auxiliary diaphragm FP1 is provided closest to the object in the third lens unit Lm3.

In the surface data of numerical examples 1 to 3, r (mm) represents a radius of curvature of an m-th optical surface counted from the object side, and d (mm) represents a lens thickness or air spacing on the optical axis between m-th and (m+1)-th surfaces. nd represents the refractive index of the m-th optical member for the d-line, and νd represents an Abbe number of the m-th optical member based on the d-line. The Abbe number of a certain material is represented as follows:

$$vd = (Nd - 1)/|NF - NC|$$

where Nd, NF, and NC are refractive indexes of the d-line (587.6 nm), F-line (486.1 nm), and C-line (656.3 nm) in the Fraunhofer line. An effective diameter (mm) is a maximum diameter of an area through which light contributing to imaging on the m-th surface passes.

In each numerical example, d, a focal length (mm), an F-number, and a half angle of view (°) are all values in a case where the zoom lens is in an in-focus state on an infinity object. BF represents a back focus. The "back focus" is a distance on the optical axis from the final lens surface (the lens surface closest to the image plane) of the zoom lens to the paraxial image plane expressed in terms of air equivalent length. An overall lens length is a length obtained by adding the back focus to the distance on the optical axis from the foremost lens surface (lens surface closest to the object) to the final lens surface.

An asterisk "*" attached to a surface number means that the surface has an aspherical shape. The aspherical shape is expressed as follows:

$$x = (h^2/R)/\left[1 + \{1 - (1+k)(h/R)^2\}^{1/2}\right] + \\ A4 \times h^4 + A6 \times h^6 + A8 \times h^8 + A10 \times h^{10} + A12 \times h^{12}$$

where x is a displacement amount from the surface vertex in the optical axis direction, h is a height from the optical axis in the direction perpendicular to the optical axis, R is a paraxial radius of curvature, k is a conical constant, and A4, A6, A8, A10, and A12 are aspherical coefficients of each order. "E±x" in each aspherical coefficient means "×10^{±x}." WIDE represents the wide-angle end, MIDDLE represents an intermediate (middle) zoom position, TELE represents a telephoto end.

Table 1 summarizes values of inequalities (1) to (5) in numerical examples 1 to 3.

Figure 2A:
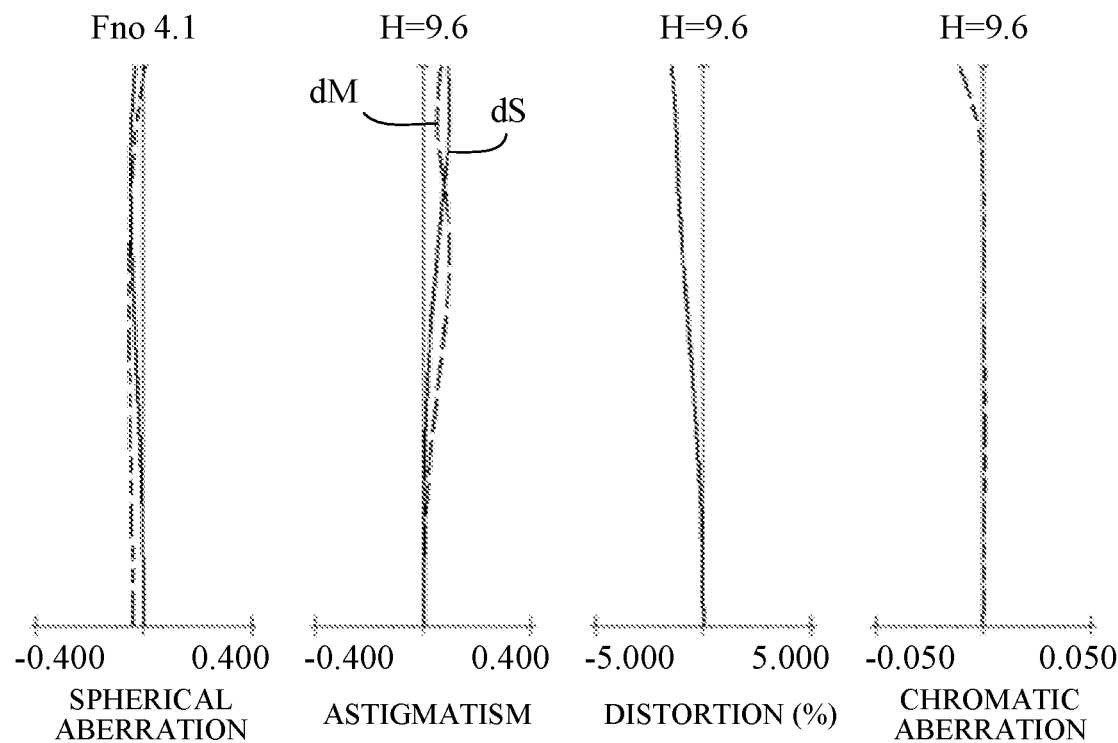
FIGS. 2A, 2B, and 2C illustrate aberrations of the zoom lens according to Example 1 at the wide-angle end, the intermediate zoom position, and the telephoto end, respectively.
Figure 2B:
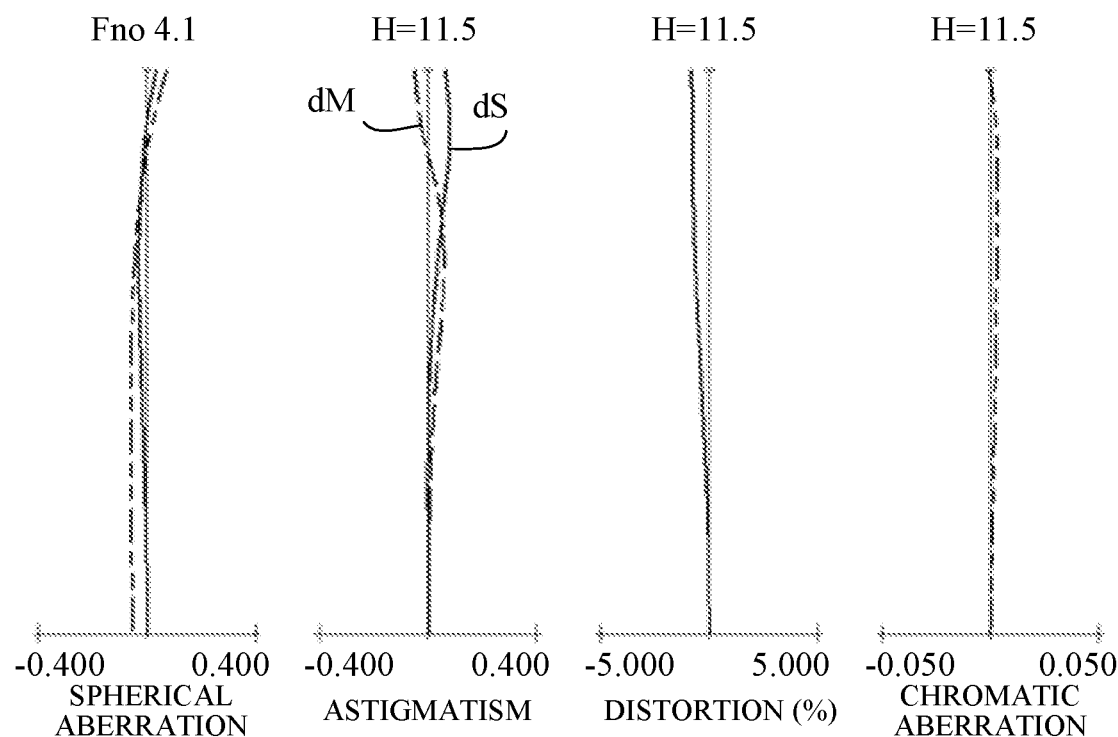
Figure 2C:
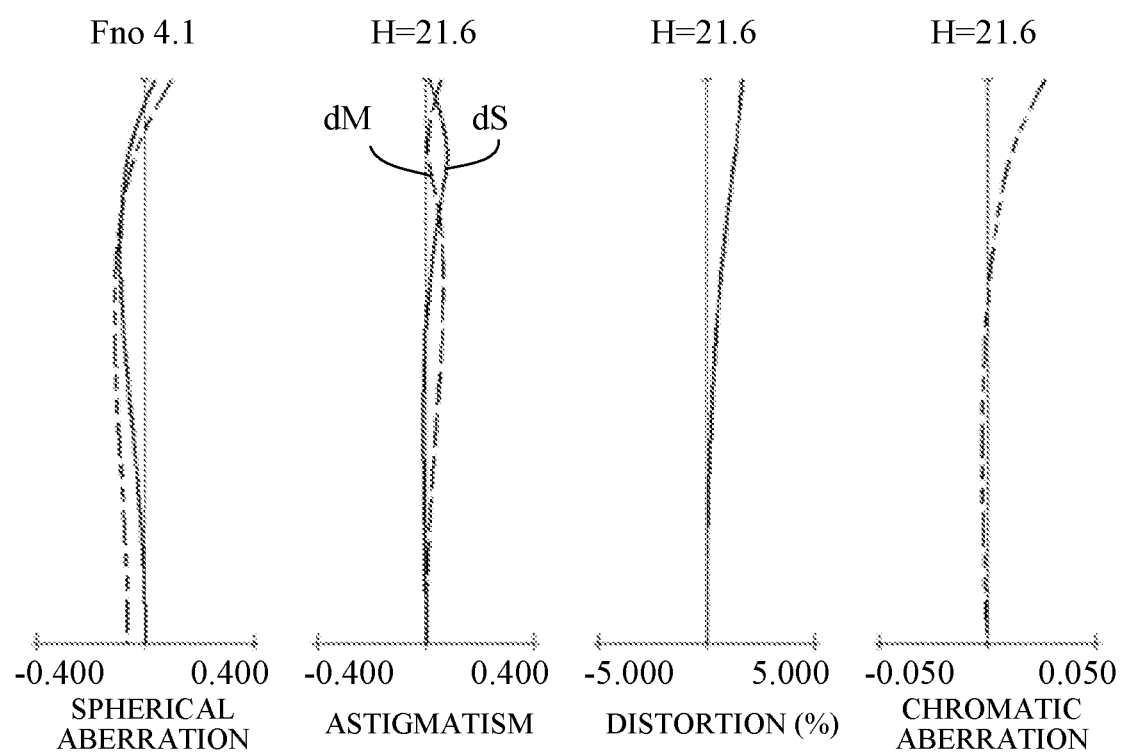
Figure 4A:
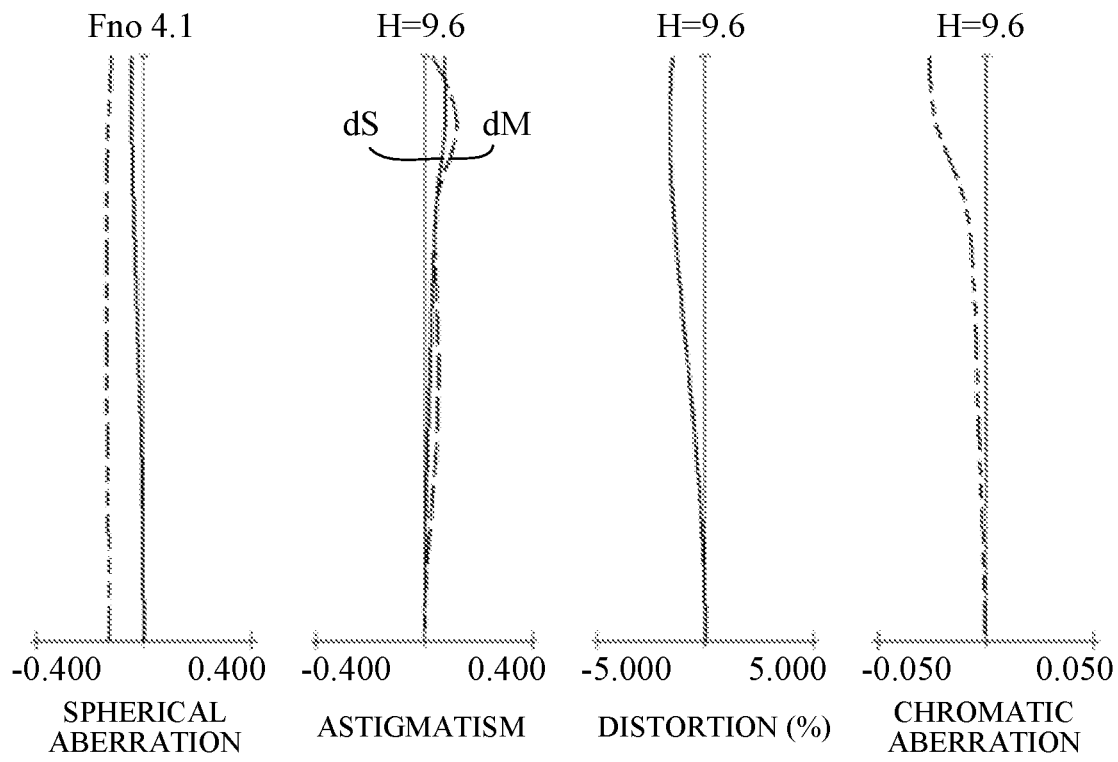
FIGS. 4A, 4B, and 4C illustrate aberrations of the zoom lens according to Example 2 at the wide-angle end, the intermediate zoom position, and the telephoto end, respectively.
Figure 4B:
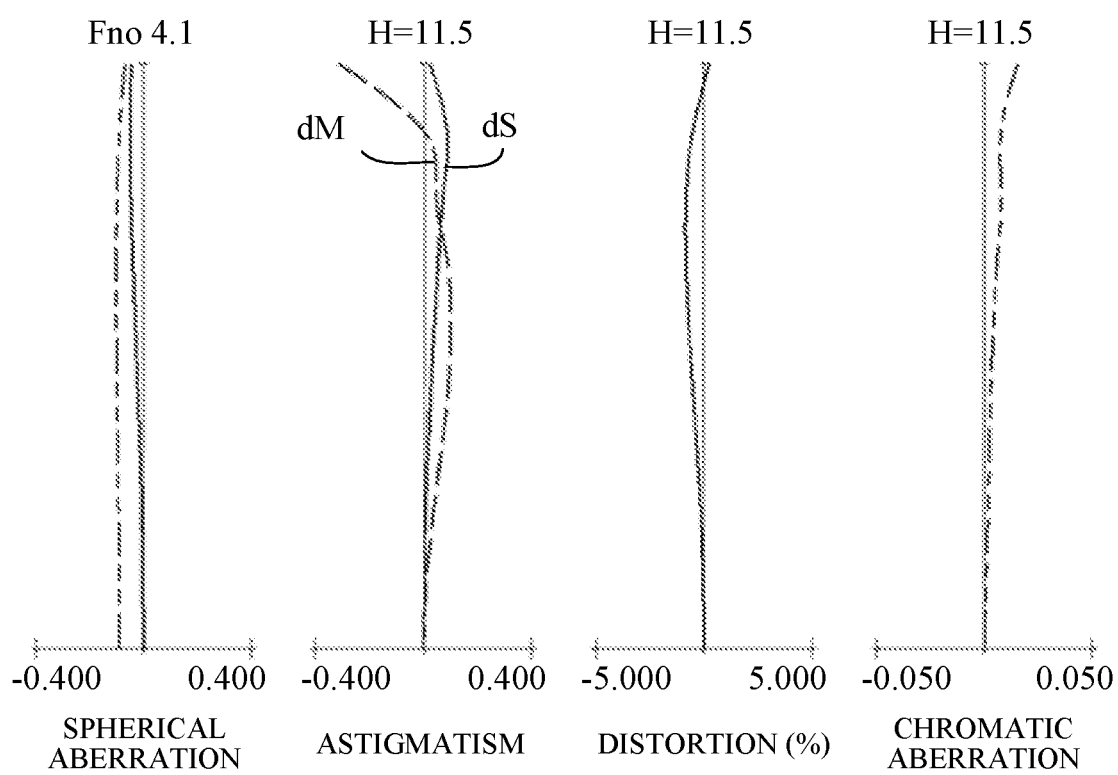
Figure 4C:
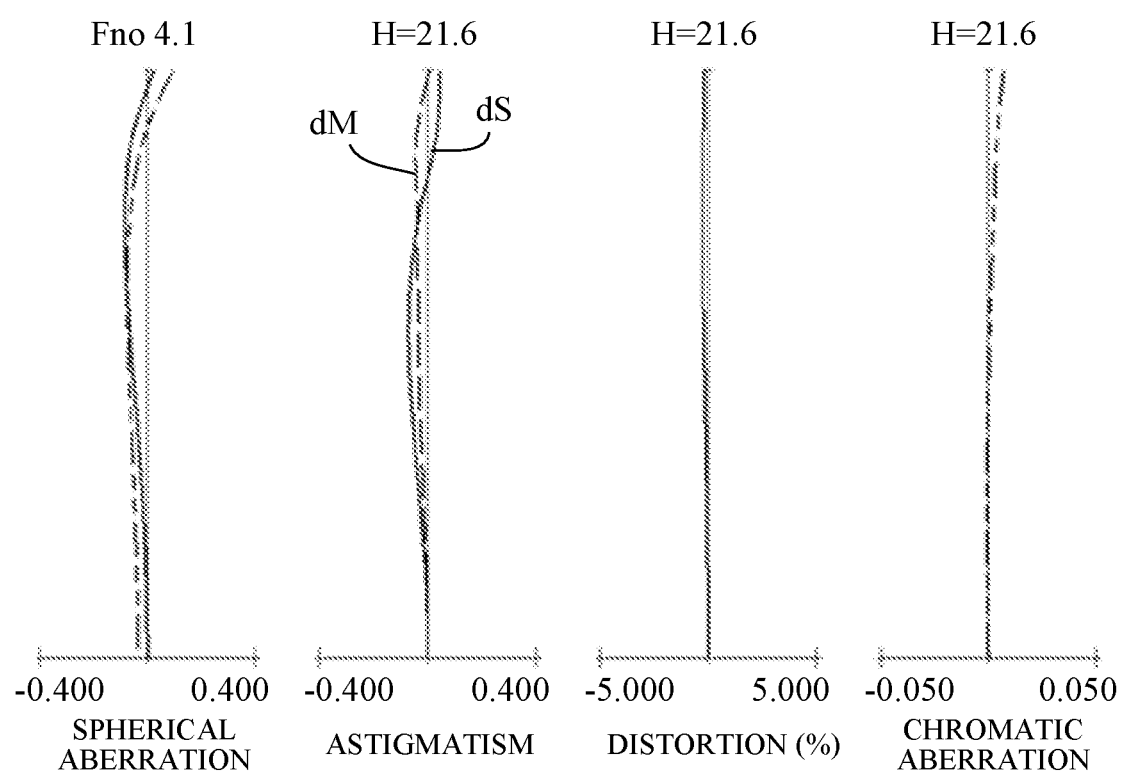
Figure 6A:
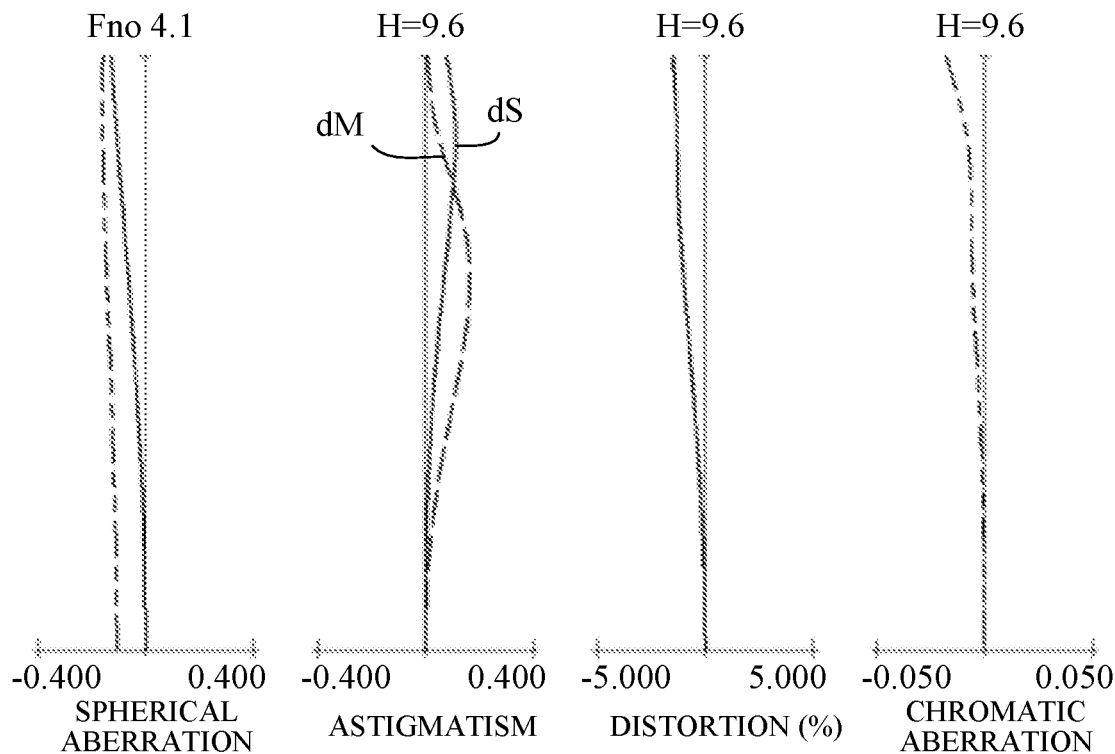
FIGS. 6A, 6B, and 6C illustrate aberrations of the zoom lens according to Example 3 at the wide-angle end, the intermediate zoom position, and the telephoto end, respectively.
Figure 6B:
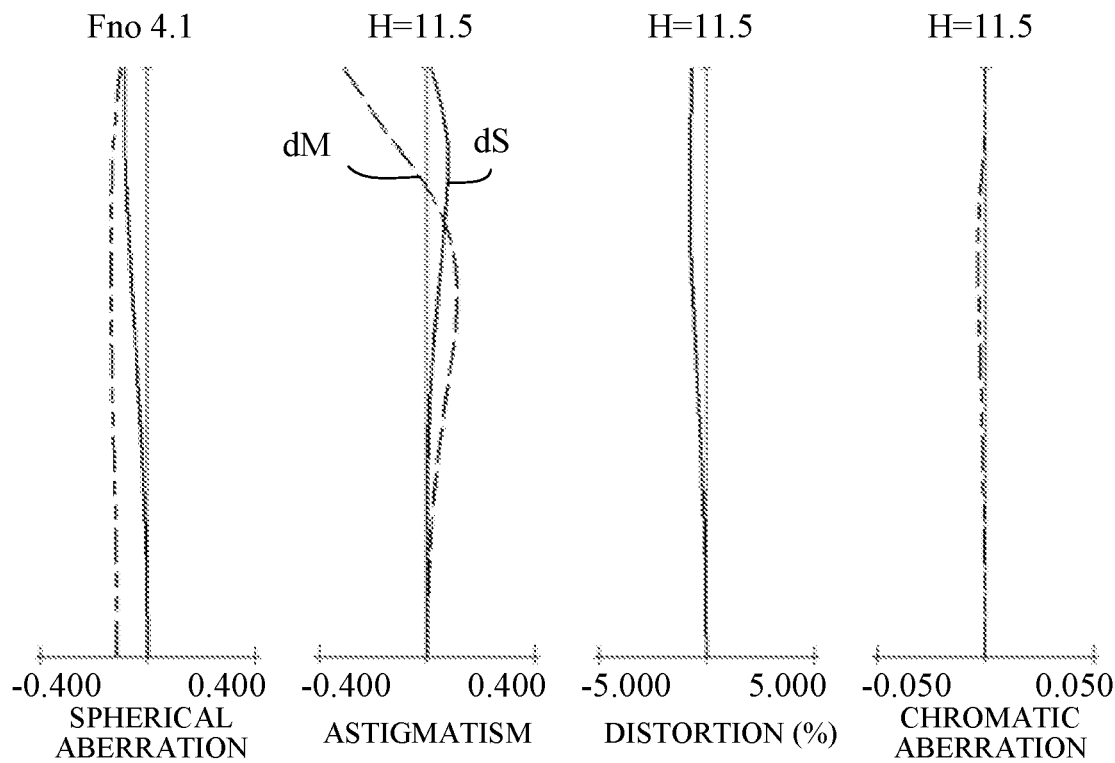
Figure 6C:
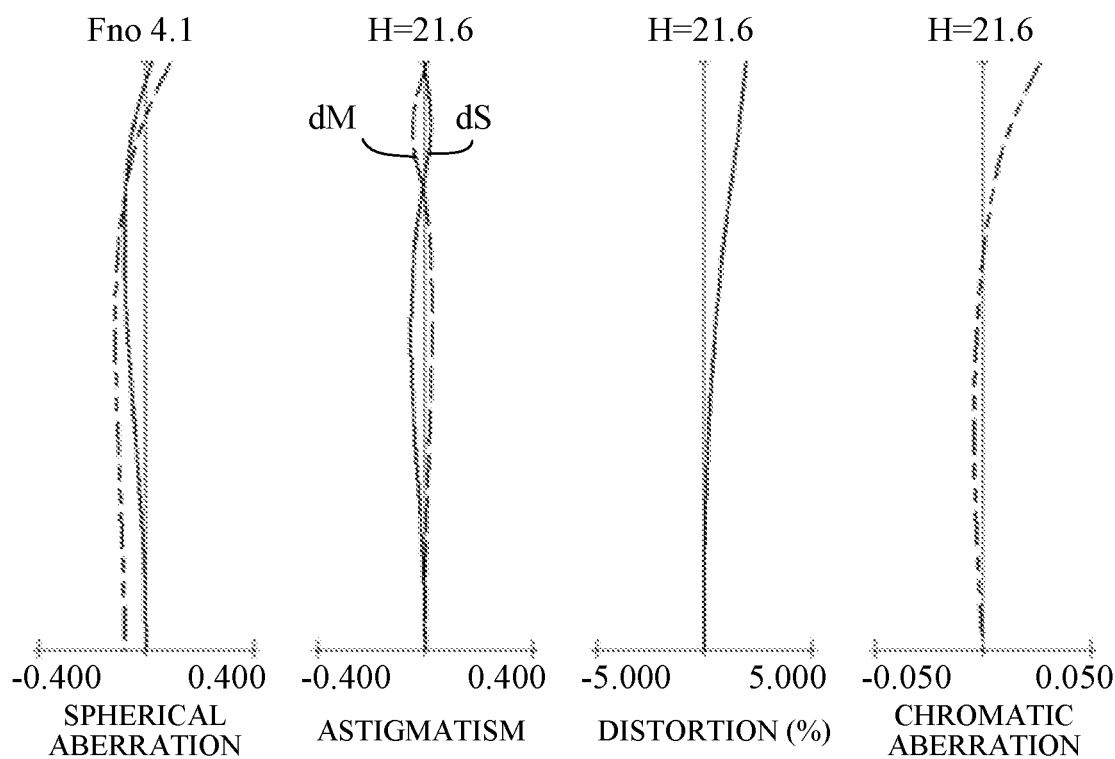

FIGS. 2A, 4A, and 6A illustrate longitudinal aberrations (spherical aberration, astigmatism, distortion, and chromatic aberration) at the wide-angle end in the in-focus state at infinity in numerical examples 1, 2, and 3, respectively. FIGS. 2B, 4B, and 6B illustrate the longitudinal aberration at the intermediate zoom position in the in-focus state at infinity in numerical examples 1, 2, and 3, respectively. FIGS. 2C, 4C, and 6C illustrate the longitudinal aberration at the telephoto end in the in-focus state at infinity in numerical examples 1, 2, and 3, respectively.

The spherical aberration diagram illustrates spherical aberration amounts for the d-line (wavelength 587.6 nm) and the g-line (wavelength 435.8 nm), and Fno as an F-number. In the astigmatism diagram, dS represents an astigmatism amount on a sagittal image plane, and dM represents an astigmatism amount on a meridional image surface. The distortion diagram illustrates a distortion amount for the d-line. The chromatic aberration diagram illustrates a lateral chromatic aberration amount for the g-line. H is the image height at each focal length. The image height H is defined by the following equation:

$$H = 2f\sin(\theta/2)$$

This equation represents the image height in iso-stereoscopic projection, which is commonly used for fisheye lenses, where f is a focal length of the zoom lens, and θ is a half angle of view (°) of the zoom lens.

NUMERICAL EXAMPLE 1
UNIT: mm

Surface Data

| Surface No. | r | d | nd | vd | Effective Diameter |
|---|---|---|---|---|---|
| 1 | 45.772 | 2.09 | 1.804 | 46.6 | 60.36 |
| 2 | 15.927 | 14.1 | 1 | 0 | 31.8 |
| 3 | 55.756 | 1.35 | 1.59282 | 68.6 | 29.11 |
| 4 | 17.972 | 7.19 | 1 | 0 | 23.42 |
| 5 | −36.505 | 1.14 | 1.59282 | 68.6 | 21.74 |
| 6 | 30.466 | 0.13 | 1 | 0 | 20.03 |
| 7 | 19.457 | 5.07 | 1.80518 | 25.4 | 19.8 |
| 8 | −134.452 | (Variable) | 1 | 0 | 18.54 |
| 9* | −29.541 | 1 | 1.85135 | 40.1 | 16.74 |
| 10 | −3236.084 | (Variable) | 1 | 0 | 16.11 |
| 11(Auxiliary Diaphragm) | | 1.39 | 1 | 0 | 8.63 |
| 12 | 30.238 | 1.36 | 1.883 | 40.8 | 9.27 |
| 13 | −82.078 | 1.19 | 1 | 0 | 9.31 |
| 14(Diaphragm) | | 1.78 | 1 | 0 | 9.28 |
| 15 | −17.751 | 0.63 | 1.883 | 40.8 | 9.26 |
| 16 | 59.181 | 0.58 | 1 | 0 | 9.61 |
| 17 | 163.861 | 2.43 | 1.51633 | 64.1 | 9.89 |
| 18 | −14.543 | 0.17 | 1 | 0 | 10.42 |
| 19 | −312.647 | 3.34 | 1.48749 | 70.2 | 11.43 |
| 20 | −10.87 | 0.67 | 1.883 | 40.8 | 12.62 |
| 21 | −16.234 | (Variable) | 1 | 0 | 13.75 |
| 22 | 45.972 | 2.53 | 1.5927 | 35.3 | 17.08 |
| 23 | 285.127 | (Variable) | 1 | 0 | 17.86 |
| 24 | −58.293 | 0.78 | 1.834 | 37.2 | 18.89 |
| 25 | 32.942 | 5 | 1.497 | 81.5 | 20.62 |
| 26 | −38.111 | 0.17 | 1 | 0 | 22.15 |
| 27 | 96.649 | 6.37 | 1.49 | 81.5 | 24.91 |
| 28 | −30.659 | (Variable) | 1 | 0 | 26.32 |
| Image Plane | ∞ | | | | |

Aspheric Data
11th Surface k = 0.00E+00 A4 = −1.66428E−05 A6= −7.40168E−08
A8 = 2.97358E−09 A10 = −3.61941E−11 A12 = 1.59528E−13

Various Data
Zoom Ratio 2.14

| | WIDE | MIDDLE | TELE |
|---|---|---|---|
| Focal Length: | 6.85 | 8.15 | 14.67 |
| Fno: | 4.12 | 4.12 | 4.12 |
| Half Angle of View (°): | 54.56 | 54.68 | 55.85 |
| Image Height: | 9.62 | 11.5 | 21.64 |
| Overall lens length: | 111.91 | 111.91 | 111.91 |
| BF: | 25.9 | 28.27 | 44.76 |
| d8 | 2.18 | 2.18 | 2.18 |
| d10 | 19.44 | 14.56 | 1.21 |
| d21 | 2.01 | 4.38 | 0.99 |
| d23 | 1.92 | 2.06 | 2.32 |
| d28 | 25.9 | 28.27 | 44.76 |

-continued

NUMERICAL EXAMPLE 1
UNIT: mm

| | | | |
|---|---|---|---|
| Entrance Pupil Position: | 17.92 | 17.66 | 16.47 |
| Exit Pupil Position: | −43.03 | −52.95 | −40.56 |
| Front Principal Point Position: | 24.08 | 24.99 | 28.62 |
| Rear Principal Point Position: | 19.05 | 20.12 | 30.08 |

Lens Unit Data

| Unit | Starting Surface | Focal Length | Overall lens length | Front Principal Point Position | Rear Principal Point Position |
|---|---|---|---|---|---|
| 1 | 1 | −25.98 | 31.07 | 1.35 | −29.48 |
| 2 | 9 | −35.02 | 1 | 0 | −0.55 |
| 3 | 11 | 30.61 | 13.53 | 7.44 | −4.42 |
| 4 | 22 | 92.11 | 2.53 | −0.3 | −1.89 |
| 5 | 24 | 75.77 | 12.31 | 14.66 | 8.37 |

Single Lens Data

| Lens | Starting Surface | Focal Length |
|---|---|---|
| 1 | 1 | −31.36 |
| 2 | 3 | −45.34 |
| 3 | 5 | −27.84 |
| 4 | 7 | 21.42 |
| 5 | 9 | −35.02 |
| 6 | 12 | 25.17 |
| 7 | 15 | −15.41 |
| 8 | 17 | 25.99 |
| 9 | 19 | 23.02 |
| 10 | 20 | −39.58 |
| 11 | 22 | 92.11 |
| 12 | 24 | −25.14 |
| 13 | 25 | 36.4 |
| 14 | 27 | 47.62 |

NUMERICAL EXAMPLE 2
UNIT: mm

Surface Data

| Surface No. | r | d | nd | vd | Effective Diameter |
|---|---|---|---|---|---|
| 1 | 50.558 | 2.09 | 1.804 | 46.6 | 64.68 |
| 2 | 17.028 | 14.3 | 1 | 0 | 34.03 |
| 3 | 41.223 | 1.35 | 1.59282 | 68.6 | 31.78 |
| 4 | 20.671 | 7.93 | 1 | 0 | 27.22 |
| 5 | −49.863 | 1.14 | 1.59282 | 68.6 | 25.88 |
| 6 | 24.397 | 0.13 | 1 | 0 | 23.42 |
| 7 | 21.294 | 5.89 | 1.80518 | 25.4 | 23.39 |
| 8 | −308.973 | (Variable) | 1 | 0 | 22.11 |
| 9* | −27.667 | 1 | 1.85135 | 40.1 | 16.02 |
| 10 | −199.045 | (Variable) | 1 | 0 | 15.46 |
| 11(Auxiliary Diaphragm) | | 1.39 | 1 | 0 | 8.97 |
| 12 | 38.138 | 1.36 | 1.883 | 40.8 | 9.6 |
| 13 | −105.103 | 1.19 | 1 | 0 | 9.67 |
| 14(Diaphragm) | | 1.78 | 1 | 0 | 9.74 |
| 15 | −12.602 | 0.63 | 1.883 | 40.8 | 9.79 |
| 16 | −21.08 | 0.89 | 1 | 0 | 10.2 |
| 17 | −61.039 | 3.62 | 1.51633 | 64.1 | 10.64 |
| 18 | −12.617 | 0.17 | 1 | 0 | 11.36 |
| 19 | −55.908 | 3.65 | 1.48749 | 70.2 | 11.26 |
| 20 | −10.688 | 0.67 | 1.883 | 40.8 | 12.42 |
| 21 | −21.337 | (Variable) | 1 | 0 | 13.71 |
| 22 | 77.117 | 2.11 | 1.5927 | 35.3 | 16.18 |
| 23 | −177.512 | (Variable) | 1 | 0 | 16.89 |
| 24 | −218.191 | 0.78 | 1.834 | 37.2 | 17.58 |
| 25 | 30.474 | 5 | 1.497 | 81.5 | 18.6 |
| 26 | −38.392 | 0.17 | 1 | 0 | 20.17 |
| 27 | 45.699 | 2.49 | 1.497 | 81.5 | 22.5 |
| 28 | −497.267 | (Variable) | 1 | 0 | 22.8 |
| Image Plane | ∞ | | | | |

-continued

NUMERICAL EXAMPLE 2
UNIT: mm

Aspheric Data

9th Surface k = 0.00000E+00 A4 = −6.84076E−06 A6 = 1.67973E−07
A8 = −2.69229E−09 A10 = 2.74481E−12 A12 = 1.33918E−13

Various Data
Zoom Ratio 2.18

|  | WIDE | MIDDLE | TELE |
|---|---|---|---|
| Focal Length: | 6.94 | 8.14 | 15.14 |
| Fno: | 4.12 | 4.12 | 4.12 |
| Half Angle of View (°): | 54.22 | 54.71 | 55.02 |
| Image Height: | 9.62 | 11.5 | 21.64 |
| Overall lens length: | 112.29 | 112.29 | 112.29 |
| BF: | 27.17 | 30.44 | 45.36 |
| d8 | 4.9 | 7.62 | 3.79 |
| d10 | 18.63 | 12.64 | 1.55 |
| d21 | 0.95 | 0.95 | 0.95 |
| d23 | 0.91 | 0.91 | 0.91 |
| d28 | 27.17 | 30.44 | 45.36 |
| Entrance Pupil Position: | 19.28 | 19.29 | 17.75 |
| Exit Pupil Position: | −28.15 | −28.15 | −28.15 |
| Front Principal Point Position: | 25.34 | 26.3 | 29.77 |
| Rear Principal Point Position: | 20.24 | 22.3 | 30.22 |

Lens Unit Data

| Unit | Starting Surface | Focal Length | Overall lens length | Front Principal Point Position | Rear Principal Point Position |
|---|---|---|---|---|---|
| 1 | 1 | −24.17 | 32.82 | 3.63 | −25.35 |
| 2 | 9 | −37.85 | 1 | −0.09 | −0.63 |
| 3 | 11 | 31.5 | 15.35 | 7.29 | −5.61 |
| 4 | 22 | 90.99 | 2.11 | 0.4 | −0.93 |
| 5 | 24 | 89.43 | 8.44 | 8.28 | 3.1 |

Single Lens Data

| Lens | Starting Surface | Focal Length |
|---|---|---|
| 1 | 1 | −32.85 |
| 2 | 3 | −71.69 |
| 3 | 5 | −27.48 |
| 4 | 7 | 24.94 |
| 5 | 9 | −37.85 |
| 6 | 12 | 31.83 |
| 7 | 15 | −36.76 |
| 8 | 17 | 30.04 |
| 9 | 19 | 26.41 |
| 10 | 20 | −24.99 |
| 11 | 22 | 90.99 |
| 12 | 24 | −32.02 |
| 13 | 25 | 35.03 |
| 14 | 27 | 84.34 |

NUMERICAL EXAMPLE 3
UNIT: mm

Surface Data

| Surface No. | r | d | nd | vd | Effective Diameter |
|---|---|---|---|---|---|
| 1 | 41.681 | 2.09 | 1.804 | 46.6 | 54.6 |
| 2 | 14.017 | 12.69 | 1 | 0 | 28 |
| 3 | 51.92 | 1.35 | 1.59282 | 68.6 | 25.47 |
| 4 | 16.676 | 5.57 | 1 | 0 | 20.51 |
| 5 | −33.537 | 1.14 | 1.59282 | 68.6 | 19.68 |
| 6 | 32.09 | 0.13 | 1 | 0 | 18.07 |
| 7 | 19.749 | 4.42 | 1.80518 | 25.4 | 17.8 |
| 8 | −131.09 | (Variable) | 1 | 0 | 16.58 |
| 9* | −29.553 | 1 | 1.85135 | 40.1 | 16.26 |

-continued

NUMERICAL EXAMPLE 3
UNIT: mm

| | | | | | |
|---|---|---|---|---|---|
| 10 | −334.817 | (Variable) | 1 | 0 | 15.69 |
| 11(Auxiliary Diaphragm) | | 1.39 | 1 | 0 | 8.43 |
| 12 | 25.186 | 1.36 | 1.883 | 40.8 | 9.11 |
| 13 | −67.721 | 1.19 | 1 | 0 | 9.13 |
| 14(Diaphragm) | | 1.78 | 1 | 0 | 9.03 |
| 15 | −15.269 | 0.63 | 1.883 | 40.8 | 8.94 |
| 16 | 51.964 | 0.62 | 1 | 0 | 9.31 |
| 17 | 154.66 | 2.76 | 1.51633 | 64.1 | 9.63 |
| 18 | −10.762 | 0.17 | 1 | 0 | 10.18 |
| 19 | 97.222 | 3.67 | 1.48749 | 70.2 | 12 |
| 20 | −11.296 | 0.67 | 1.883 | 40.8 | 13.03 |
| 21 | −23.158 | (Variable) | 1 | 0 | 14.4 |
| 22 | 44.333 | 2.87 | 1.5927 | 35.3 | 17.57 |
| 23 | 373.153 | (Variable) | 1 | 0 | 18.46 |
| 24 | −114.494 | 0.78 | 1.834 | 37.2 | 19.5 |
| 25 | 29.318 | 5 | 1.497 | 81.5 | 20.96 |
| 26 | −47.487 | 0.17 | 1 | 0 | 22.39 |
| 27 | 183.166 | 6.53 | 1.497 | 81.5 | 24.32 |
| 28 | −30.057 | (Variable) | 1 | 0 | 26.13 |
| Image Plane | ∞ | | | | |

Aspheric Data

9th Surface k = 0.00000E+00 A4 = −1.90220E−05 A6 = −1.38843E−07
A8 = 6.57260E−09 A10 = −9.82800E−11 A12 = 4.93245E−13

Various Data
Zoom Ratio 2.15

| | WIDE | MIDDLE | TELE |
|---|---|---|---|
| Focal Length: | 6.81 | 8.16 | 14.65 |
| Fno: | 4.12 | 4.12 | 4.12 |
| Half Angle of View (°): | 54.72 | 54.63 | 55.9 |
| Image Height: | 9.62 | 11.5 | 21.64 |
| Overall lens length: | 103.36 | 103.36 | 103.36 |
| BF: | 20.84 | 23.28 | 40.16 |
| d8 | 1.19 | 1.19 | 1.19 |
| d10 | 18.54 | 13.75 | 1.1 |
| d21 | 2.63 | 4.92 | 0.99 |
| d23 | 2.18 | 2.24 | 1.94 |
| d28 | 20.84 | 23.28 | 40.16 |
| Entrance Pupil Position: | 16 | 15.73 | 14.57 |
| Exit Pupil Position: | −46.4 | −56.48 | −39.82 |
| Front Principal Point Position: | 22.12 | 23.06 | 26.54 |
| Rear Principal Point Position: | 14.02 | 15.12 | 25.51 |

Lens Unit Data

| Unit | Starting Surface | Focal Length | Overall lens length | Front Principal Point Position | Rear Principal Point Position |
|---|---|---|---|---|---|
| 1 | 1 | −20.7 | 27.38 | 2.57 | −22.91 |
| 2 | 9 | −38.13 | 1 | −0.05 | −0.6 |
| 3 | 11 | 27.54 | 14.24 | 6.07 | −6.28 |
| 4 | 22 | 84.61 | 2.87 | −0.24 | −2.04 |
| 5 | 24 | 75.6 | 12.48 | 13.57 | 6.65 |

Single Lens Data

| Lens | Starting Surface | Focal Length |
|---|---|---|
| 1 | 1 | −27.18 |
| 2 | 3 | −42.04 |
| 3 | 5 | −27.48 |
| 4 | 7 | 21.6 |
| 5 | 9 | −38.13 |
| 6 | 12 | 20.93 |
| 7 | 15 | −13.31 |
| 8 | 17 | 19.6 |
| 9 | 19 | 20.99 |
| 10 | 20 | −25.65 |
| 11 | 22 | 84.61 |
| 12 | 24 | −27.92 |

-continued

NUMERICAL EXAMPLE 3
UNIT: mm

| 13 | 25 | 37.28 |
|----|----|-------|
| 14 | 27 | 52.49 |

TABLE 1

| Inequality | Numerical Ex. 1 | Numerical Ex. 2 | Numerical Ex. 3 |
|------------|-----------------|-----------------|-----------------|
| (1) | 8.42 | 8.84 | 7.64 |
| (2) | 3.78 | 3.92 | 3.06 |
| (3) | 0.69 | 0.71 | 0.77 |
| (4) | −2.07 | −2.02 | −2.01 |
| (5) | 182 | 179 | 187 |

Image Pickup Apparatus

Figure 7:
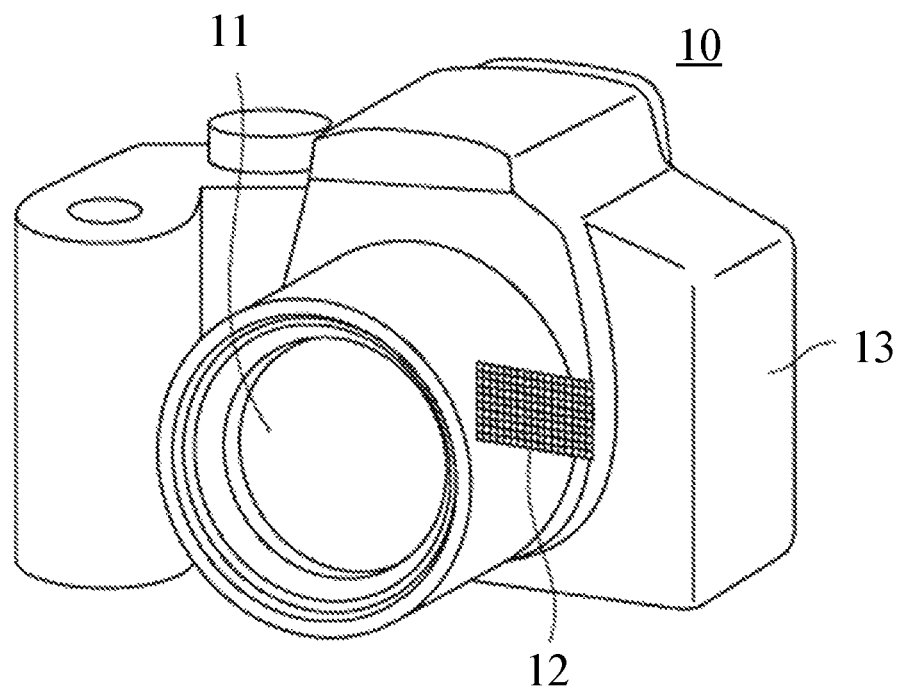
FIG. 7 illustrates an image pickup apparatus having a zoom lens according to any one of Examples 1 to 3.

FIG. 7 illustrates a digital still camera (image pickup apparatus) using the zoom lens L0 according to any one of Examples 1 to 3 as an imaging optical system. In FIG. 7, reference numeral 10 denotes a camera body, and reference numeral 11 denotes an imaging optical system including the zoom lens according to any one of Examples 1 to 3. Reference numeral 12 denotes a solid-state image sensor (photoelectric conversion element) such as a CCD sensor or a CMOS sensor, which is built into the camera body 10, receives an optical image formed by the imaging optical system 11, and photoelectrically converts it, that is, captures an image of an object.

The camera body 10 may be a single-lens reflex camera with a quick turn mirror, or a mirrorless camera without a quick turn mirror. The imaging optical system 11 may be configured as an interchangeable lens attachable to and detachable from the camera body 10, or may be configured as a lens unit in a lens integrated type camera.

In this way, using the zoom lens L0 according to any one of Examples 1 to 3 as an imaging optical system can provide imaging with a wide angle of view and fewer fluctuations in optical performance associated with zooming.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a wide-angle zoom lens that is beneficial to reducing the weight of the movable lens unit and achieving excellent optical performance over the entire zoom range.

This application claims priority to Japanese Patent Application No. 2023-063092, which was filed on Apr. 7, 2023, and which is hereby incorporated by reference herein in its entirety.

What is claimed is:

1. A zoom lens comprising, in order from an object side to an image side:
    a first lens unit having negative refractive power; and
    a plurality of subsequent lens units,
    wherein the zoom lens further comprises an aperture stop,
    wherein for zooming, the first lens unit is fixed, and the plurality of subsequent lens units move to change a distance between adjacent lens units, and
    wherein the following inequalities are satisfied:

$$5.5 \leq Tsw/fw \leq 9.5$$

$$2.5 \leq Skw/fw \leq 7.0$$

where Tsw is a distance on an optical axis from a lens surface closest to an object of the zoom lens to the aperture stop at a wide-angle end, fw is a focal length of the zoom lens at the wide-angle end, and Skw is a back focus of the zoom lens at the wide-angle end.

2. The zoom lens according to claim 1, wherein the following inequality is satisfied:

$$0.60 \leq T1w/Skw \leq 1.00$$

where T1w is an entrance pupil position of the zoom lens at the wide-angle end.

3. The zoom lens according to claim 1, wherein for focusing, the first lens unit is fixed, and a whole or part of one of the plurality of subsequent lens units moves.

4. The zoom lens according to claim 3, wherein the whole or part has negative refractive power.

5. The zoom lens according to claim 3, wherein the whole or part moves toward the object side during focusing from infinity to a close distance.

6. The zoom lens according to claim 1, wherein the following inequality is satisfied:

$$-2.5 \leq (R2 + R1)/(R2 - R1) \leq -1.8$$

where R1 is a radius of curvature of a lens surface on the object side of a lens closest to the object in the zoom lens, and R2 is a radius of curvature of a lens surface on the image side of the lens closest to the object in the zoom lens.

7. The zoom lens according to claim 1, wherein the following inequality is satisfied:

$$170° \leq 2\omega \leq 190°$$

where $\omega$ is a half angle of view of the zoom lens at the wide-angle end.

8. The zoom lens according to claim 1, wherein the plurality of subsequent lens units include, in order from the object side to the image side, a second lens unit having positive refractive power, a third lens unit having positive refractive power, and a fourth lens unit having positive refractive power.

9. The zoom lens according to claim 8, wherein a part of the second lens unit moves for focusing.

10. The zoom lens according to claim 1, wherein the plurality of subsequent lens units include, in order from the object side to the image side, a second lens unit having negative refractive power and a third lens unit having positive refractive power.

11. The zoom lens according to claim 10, wherein the second lens unit moves for focusing.

12. The zoom lens according to claim 10, wherein the first lens unit has two negative lenses each having a concave surface facing the object.

13. An image pickup apparatus comprising:
a zoom lens; and
an image sensor configured to image an object through the zoom lens,
wherein the zoom lens includes, in order from an object side to an image side:
a first lens unit having negative refractive power; and
a plurality of subsequent lens units,
wherein the zoom lens further comprises an aperture stop,
wherein for zooming, the first lens unit is fixed, and the plurality of subsequent lens units move to change a distance between adjacent lens units, and
wherein the following inequalities are satisfied:

$$5.5 \leq Tsw/fw \leq 9.5$$

$$2.5 \leq Skw/fw \leq 7.0$$

where Tsw is a distance on an optical axis from a lens surface closest to an object of the zoom lens to the aperture stop at a wide-angle end, fw is a focal length of the zoom lens at the wide-angle end, and Skw is a back focus of the zoom lens at the wide-angle end.

* * * * *